United States Patent
Padala et al.

(10) Patent No.: US 9,026,466 B2
(45) Date of Patent: May 5, 2015

(54) FINANCIAL AUDIT SCOPING WORKBENCH

(75) Inventors: Appla Jagadesh Padala, Irving, TX (US); Dane Roberts, Redwood City, CA (US); Bhaskar Ghosh, Pleasanton, CA (US); Hernan Capdevila, San Juan Capistrano, CA (US)

(73) Assignee: Oracle International Corporation, Redwood Shores, CA (US)

( * ) Notice: Subject to any disclaimer, the term of this patent is extended or adjusted under 35 U.S.C. 154(b) by 619 days.

(21) Appl. No.: 12/761,766

(22) Filed: Apr. 16, 2010

(65) Prior Publication Data

US 2011/0258088 A1  Oct. 20, 2011

(51) Int. Cl.
G06Q 40/00  (2012.01)
G06Q 10/06  (2012.01)
G06T 11/20  (2006.01)
G06Q 40/02  (2012.01)

(52) U.S. Cl.
CPC .............. *G06Q 40/12* (2013.01); *G06Q 10/06* (2013.01); *G06T 11/206* (2013.01); *G06Q 40/02* (2013.01)

(58) Field of Classification Search
CPC ....... G06Q 40/12; G06Q 10/02; G06Q 40/02; G06T 11/206
USPC ........ 705/30, 7.27, 7.28, 7.41, 7.42; 345/619, 345/581, 440
See application file for complete search history.

(56) References Cited

U.S. PATENT DOCUMENTS

| | | | |
|---|---|---|---|
| 7,353,232 B1 | 4/2008 | Kalucha et al. | |
| 7,506,001 B2 | 3/2009 | Johnson et al. | |
| 7,940,899 B2* | 5/2011 | Moorman et al. | 379/88.19 |
| 8,600,929 B2* | 12/2013 | Paul | 707/600 |
| 2004/0260566 A1* | 12/2004 | King | 705/1 |
| 2005/0197952 A1 | 9/2005 | Shea et al. | |
| 2008/0235041 A1* | 9/2008 | Cashdollar et al. | 705/1 |
| 2008/0255971 A1* | 10/2008 | McKinnon et al. | 705/31 |
| 2010/0275263 A1* | 10/2010 | Bennett et al. | 726/25 |

OTHER PUBLICATIONS

Oracle, "Oracle® Hyperion Financial Management, Fusion Edition; User's Guide", release 11.1.1.3, http://download.oracle.com/docs/cd/E12825_01/epm.111/hfm_functions_library.pdf.
Oracle, "Oracle® Enterprise Governance, Risk and Compliance Manager; User's Guide", release 1; Part No. E15287-01, Sep. 2009, http://download.oracle.com/otn_hosted_doc/logicalapps/grcm_ug_80.pdf.
Roberts, et al., "FulcrumWay; Case Study GRC Implementation—A User Perspective", Jan. 21, 2009, http://www.fulcrumway.com/images/stories/newsletters/hstx_grc_implementation_casestudy.pdf.
Public Company Accounting Oversight Board, "An Audit of Internal Control Over Financial Reporting That is Integrated with an Audit of Financial Statements", Jun. 12, 2007.

* cited by examiner

*Primary Examiner* — F. Zeender
*Assistant Examiner* — Milena Racic
(74) *Attorney, Agent, or Firm* — Miles & Stockbridge P.C.

(57) ABSTRACT

A computer-readable medium, computer-implemented method, and apparatus are provided. In one embodiment, financial data is extracted from a financial manager, and the financial data is mapped to compliance data from a compliance manager. One or more controls of one or more accounts from compliance data is selected to be in scope, and an assessment plan is created for the selected one or more controls within scope.

29 Claims, 10 Drawing Sheets

FINANCIAL AUDIT SCOPING WORKBENCH

FIELD

One embodiment is directed generally to a computer system, and in particular to a computer system that provides for financial auditing.

BACKGROUND

Legislators, regulators, and investors are placing increasing mandates on businesses to improve transparency and controls over financial and compliance reporting. Laws such as the U.S. Sarbanes Oxley Act ("SOX"), Canadian Bill 198, OMB Circular 123A, and Japanese SOX, are forcing organizations to adopt rigorous approaches to documenting and testing internal processes and controls. The progression of financial compliance regulation that began with SOX has evolved from a bottom-up, controls-coverage approach toward a top-down approach taking risk management into consideration. For example, Auditing Standard No. 5, released by the Public Company Accounting Oversight Board, encourages a top-down approach, in providing guidance to auditors engaged to perform an audit of management's assessment of the effectiveness of internal control over financial reporting.

In the context of a financial audit, a risk is defined as the chance of an event occurring that will have a positive or negative impact on the objectives of an organization. A control is defined as an existing process, policy, device, practice, or other action that acts to minimize negative risk or enhance positive opportunities. A business process and its risks and controls can be reviewed periodically to determine how they are defined and implemented. An assessment can be used to evaluate the validity and effectiveness of controls, risks, and the business process to find out if any element is missing, out of place, or has changed. An assessment may be performed on one or more risks, one or more controls, or a combination of risks and controls.

In previous financial audit systems, the process of determining a scope of a financial audit is generally done manually, and determining the scope is accomplished using spreadsheets and financial statements. All accounts of an audit are listed with their accompanying balances in a spreadsheet or financial statement and a user manually iterates through the information to identify the accounts that are within the scope of the audit.

SUMMARY

One embodiment is directed to a computer-readable medium having instructions stored thereon that, when executed by a processor, cause the processor to perform audit scoping. The instructions include extracting financial data from a financial manager, and mapping the financial data to compliance data from a compliance manager. The instructions further includes selecting one or more controls of one or more accounts from compliance data to be in scope, and creating an assessment plan for the selected one or more controls within scope.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

As described above, in previous financial audit systems, the process of determining a scope of a financial audit is generally done manually. In these previous financial audit systems, accounts, and controls that are tied to accounts, need to be selected manually. These previous financial audit systems do not provide immediate feedback on a cost or coverage of the audit, nor can they provide rules and criteria used when determining the scope of the audit.

According to one embodiment of the invention, a new computer-implemented method, computer-readable medium, and apparatus for financial audit scoping is provided. In the embodiment, a workbench interface is provided that brings together financial data and compliance data into a single workspace, by importing financial data into the workspace. The workbench interface provides a user interface which allows a user to identify and select one or more controls as being within a scope of a financial audit. The workbench interface then creates an assessment plan for each selected control.

According to an embodiment, the workbench interface can provide immediate feedback in terms of the criteria and cost of the audit and the coverage it provides. The available criterion that can be used individually or in combinations includes: Perspective Profiles, such as selecting by financial accounts and organizational entities; Financial Profiles, such as selecting by account balance thresholds that occur within or outside a specified range, or specified percentage of a total amount; and Risk Profiles, such as selecting risk-mitigation controls by risk attributes including risk ratings, risk tolerances, inherent risk impact and likelihood, and whether the risk-mitigation control is classified as a key control or classification. The workbench interface can also allow a user to query historical selections. Furthermore, the workbench interface can provide an easy-to-use format and allow for an easier selection of accounts and controls for an audit.

Figure 1:
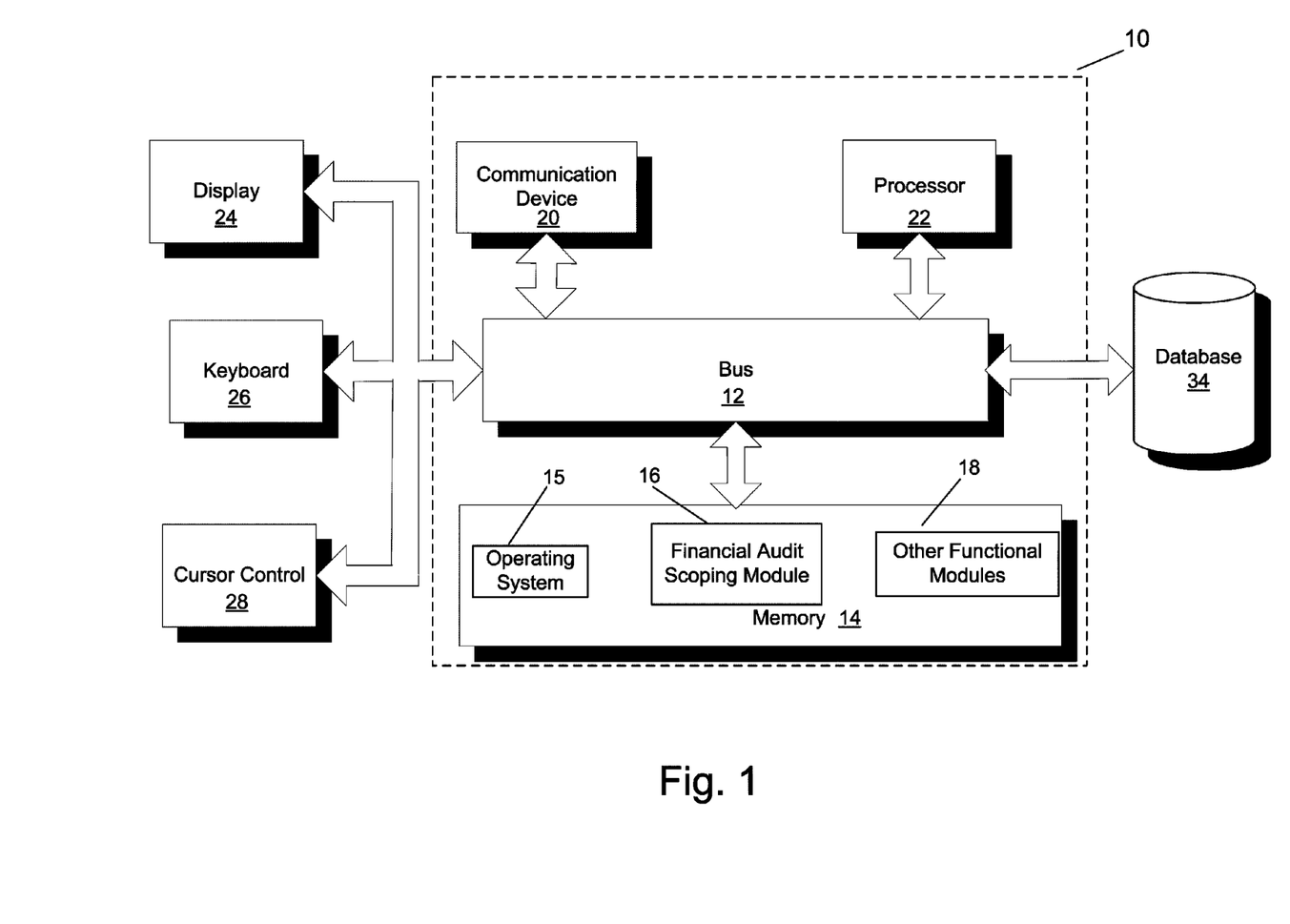
FIG. 1 illustrates a block diagram of an apparatus that may implement an embodiment of the invention.

FIG. 1 illustrates a block diagram of an apparatus 10 that may implement one embodiment of the invention. Apparatus 10 includes a bus 12 or other communications mechanism for communicating information between components of apparatus 10. Apparatus 10 also includes a processor 22, operatively coupled to bus 12, for processing information and executing instructions or operations. Processor 22 may be any type of general or specific purpose processor. Apparatus 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Apparatus 10 further includes a communication device 20, such as a network interface card or other communications interface, to provide access to a network. As a result, a user may interface with apparatus 10 directly, or remotely through a network or any other method.

A computer-readable medium may be any available medium that can be accessed by processor 22. Computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with apparatus 10.

According to one embodiment, memory 14 can store software modules that may provide functionality when executed by processor 22. The modules can include an operating system 15, a financial audit scoping module 16, as well as other functional modules 18. Operating system 15 can provide an operating system functionality for apparatus 10. Financial audit scoping module 16 can provide for scoping of a financial audit, as will be described in more detail below. Apparatus 10 can also be part of a larger system. Thus, apparatus 10 can include one or more additional functional modules 18 to include the additional functionality. For example, functional modules 18 may include compliance modules that are part of the "Enterprise Governance, Risk and Compliance Manager" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As described above, in an embodiment, a workbench interface is provided that brings together financial data and compliance data into a single workspace. The workbench interface is capable of allowing a user to import financial data from a financial manager into one or more staging tables. A user can then map the financial data to compliance data from a compliance manager. Once the financial data has been mapped to the compliance data, a user can use the workbench interface to select one or more accounts that are in scope of an audit. The controls that are tied to one or more accounts can be added to a cart and graphically analyzed for financial coverage and properties. Once a user has completed the selection process, the workbench interface can automatically generate an assessment plan for the controls that are within scope.

In an embodiment, the compliance manager may include a set of functional modules which provide an integrated system of components necessary to manage governance, risk, and compliance objectives. Business initiatives are documented processes that include metrics and time frames and are used to define business goals. The compliance manager can provide core services and application business components from which business initiative specific application modules can be built. For example, the compliance manager can provide components that describe risks and controls. When included in a business model, components can be used to support a specific business initiative, such as financial compliance. In addition to components, the compliance manager can provide user-defined attributes to provide additional classification or other clarifying information specific to a particular business.

Furthermore, the compliance manager can provide perspectives which provide a hierarchical shape, structure, and organization for components (such as risks and controls). A perspective can include an element that is associated to a component (identified as a "perspective item"), and structure or arrangement of one or more perspective items (identified as a "perspective hierarchy"). An example of a perspective hierarchy is an account.

An example of a perspective according to an embodiment is an organization perspective. A organization is a perspective type that has additional features not available to other perspective types. A relationship to an organization perspective item is propagated down to other related business components. For example, in a financial governance module, business process components can have an associated organization perspective. In order words, when an organization for a process is defined, when a risk is related to the process, the organization perspective of that process can become the organization perspective for the risk. Likewise, when a control is related to the risk, the control can receive the organization perspective from the risk.

In an embodiment of the invention, the compliance manager can be the "Enterprise Governance, Risk and Compliance Manager" product from Oracle Corporation. However, one of ordinary skill in the art would readily appreciate that the compliance manager may be any application that allows a user to create and manage business processes that support financial compliance.

In an embodiment, the financial manager can be an application that delivers global collection, financial consolidation, reporting, and analysis, of enterprise financial information. The financial manager can include financial management data and metadata. The financial manager may be a single-tier application or a multi-tier application. In a multi-tier embodiment, the financial manager may include a client tier, a web server tier, a middle tier, and a data tier. The client tier can contain a user interface, and can have the ability to communicate with the middle tier. The client tier can also display data and metadata to a user, and allow user to enter data. The web server tier can allow a user to access web-enabled portions of financial management. The middle tier can contain the domain intelligence and connection to the data tier. The data tier can contain the financial management data and metadata. In an embodiment, the financial management data can be stored in a relational database.

In an embodiment, the financial manager can organize the financial management data through the use of dimensions. Dimensions describe an organization's data and can contain groups of related members. Dimensions can be arranged in hierarchies. For example, dimensions can be separated into upper-level members (called parent members), lower-level members (called base-level members), and middle-level members, where all members below a parent are referred to as descendants, and a member immediately below a parent member is referred to as a child of a parent member. Examples of dimensions can include an account dimension, an entity dimension, a period dimension, a scenario dimension, a year dimension, a value dimension, an intercompany dimension, and a view dimension.

The account dimension can represent a hierarchy of natural accounts, where an account can store financial data for entities and scenarios in an application. The entity dimension can represent an organizational structure of the company, such as management and legal reporting structures. For example, entities can represent divisions, subsidiaries, plants, regions, countries, legal entities, business units, departments, or any organizational unit. The period dimension can represent time periods, such as quarters and months. The scenario dimension can represent a set of data, such as data from a general ledger, data that reflects targeted business operations, data that corresponds to predictions for upcoming periods, or data calculated according to legal rules. The year dimension can represent the fiscal or calendar year for data. The value dimension can include different types of values, such as input currency, parent currency, adjustments, and consolidation details. The intercompany dimension can represent all intercompany balances that exist for an account. The view dimension can represent various modes of calendar intelligence, such as periodic, year-to-date and quarter-to-date frequencies.

In an embodiment of the invention, the financial manager can be the "Hyperion Financial Management" product from Oracle Corporation. However, one of ordinary skill in the art would readily appreciate that the financial manager may be any application that manages enterprise financial information. For example, the financial manager can be the "Oracle General Ledger" product or the "PeopleSoft Enterprise General Ledger" product from Oracle Corporation.

Figure 2:
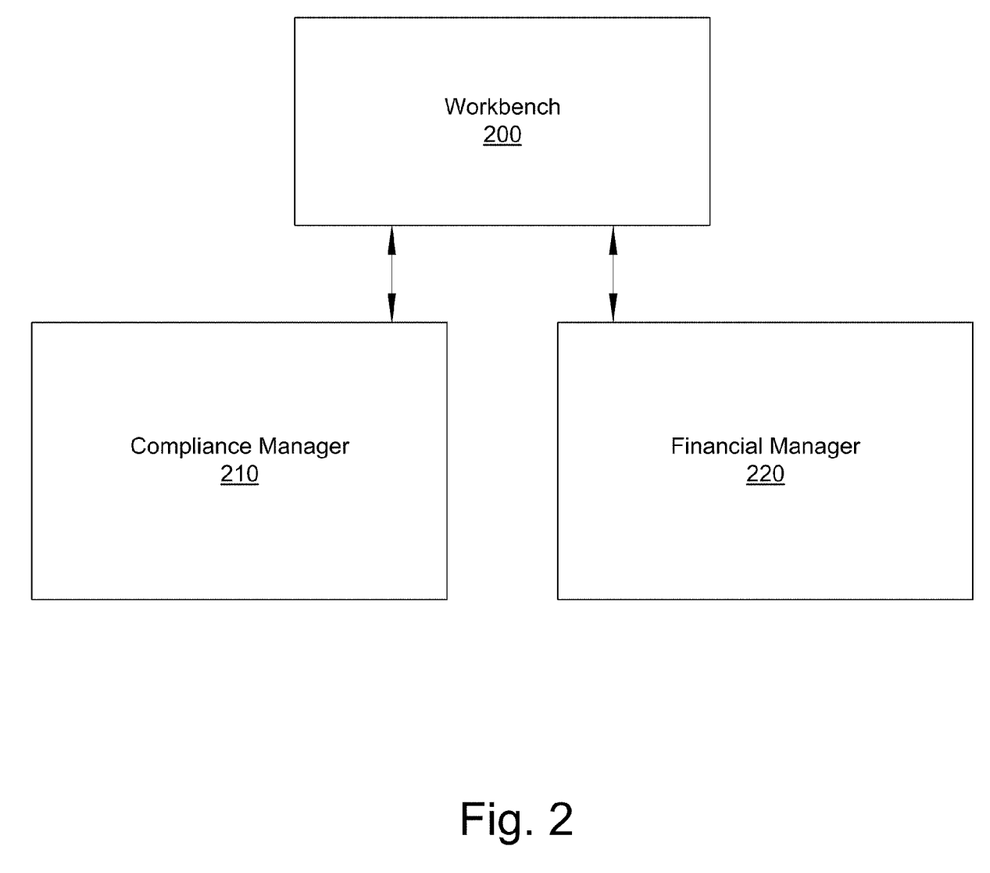
FIG. 2 illustrates a stand-alone implementation of a workbench interface according to an embodiment of the invention.

The workbench interface can be a composite application that interfaces with the compliance manager and the financial manager. The composite application may be a computer application or an Internet application capable of being run in a web browser. The composite application can be implemented in different ways according to embodiments of the invention. FIG. 2 illustrates a stand-alone implementation of a workbench interface according to an embodiment of the invention. In the illustrated embodiment, the implementation includes workbench 200, compliance manager 210 and financial manager 220. As can be seen in FIG. 2, workbench 200 is a stand-alone application that is separate from both compliance manager 210 and financial manager 220. Workbench 200 is capable of connecting to compliance manager 210 and financial manager 220, where workbench 200 can access compliance data of compliance manager 210 and financial data of financial manager 220. In an embodiment of the invention, workbench 200 corresponds to financial audit scoping module 16 of FIG. 1.

Figure 3:
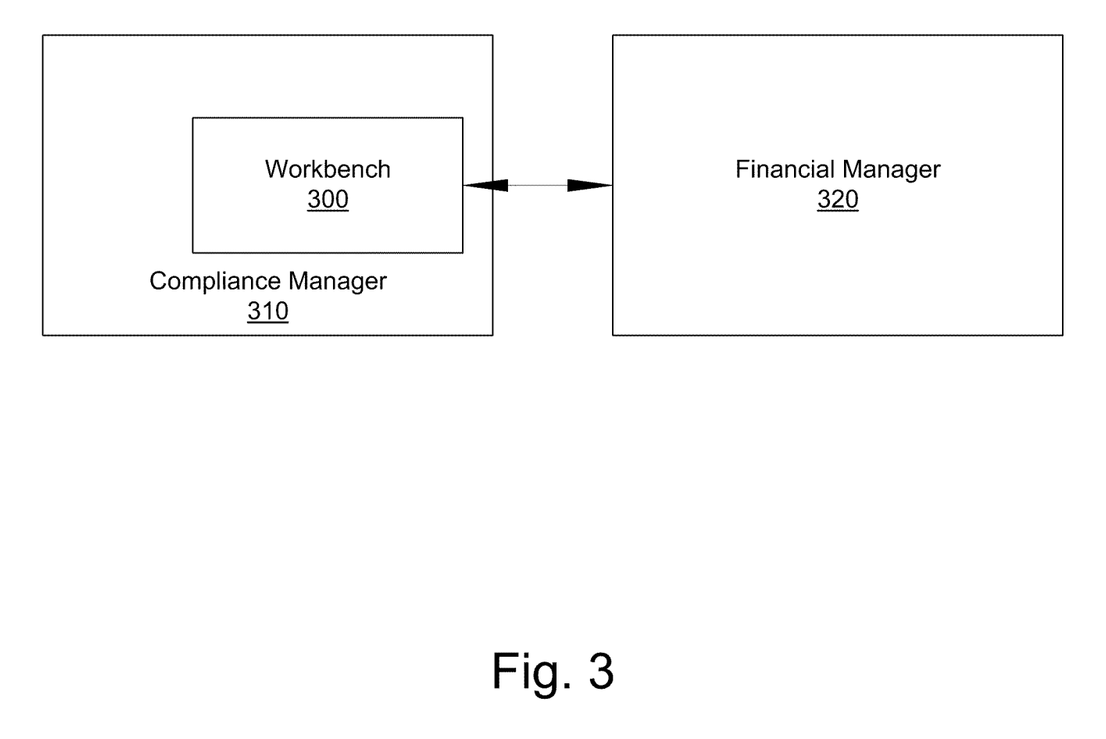
FIG. 3 illustrates an implementation of a workbench interface where the workbench interface is part of a compliance data manager according to an embodiment of the invention.

FIG. 3 illustrates an implementation of a workbench interface where the workbench interface is part of a compliance data manager according to an embodiment of the invention. In the illustrated embodiment, the implementation includes workbench 300, compliance manager 310, and financial manager 320, similar to the illustrated embodiment of FIG. 2. Unlike the embodiment illustrated in FIG. 2, workbench 300 is not a stand-alone application, but instead is part of compliance manager 310 in the illustrated embodiment of FIG. 3. As part of compliance manager 310, workbench 300 can access the compliance data of compliance manager 310. Furthermore, workbench 300 is capable of connecting to financial manager 320, where workbench 300 can access financial data of financial manager 320. In an embodiment of the invention, workbench 300 corresponds to financial audit scoping module 16 of FIG. 1.

Figure 4:
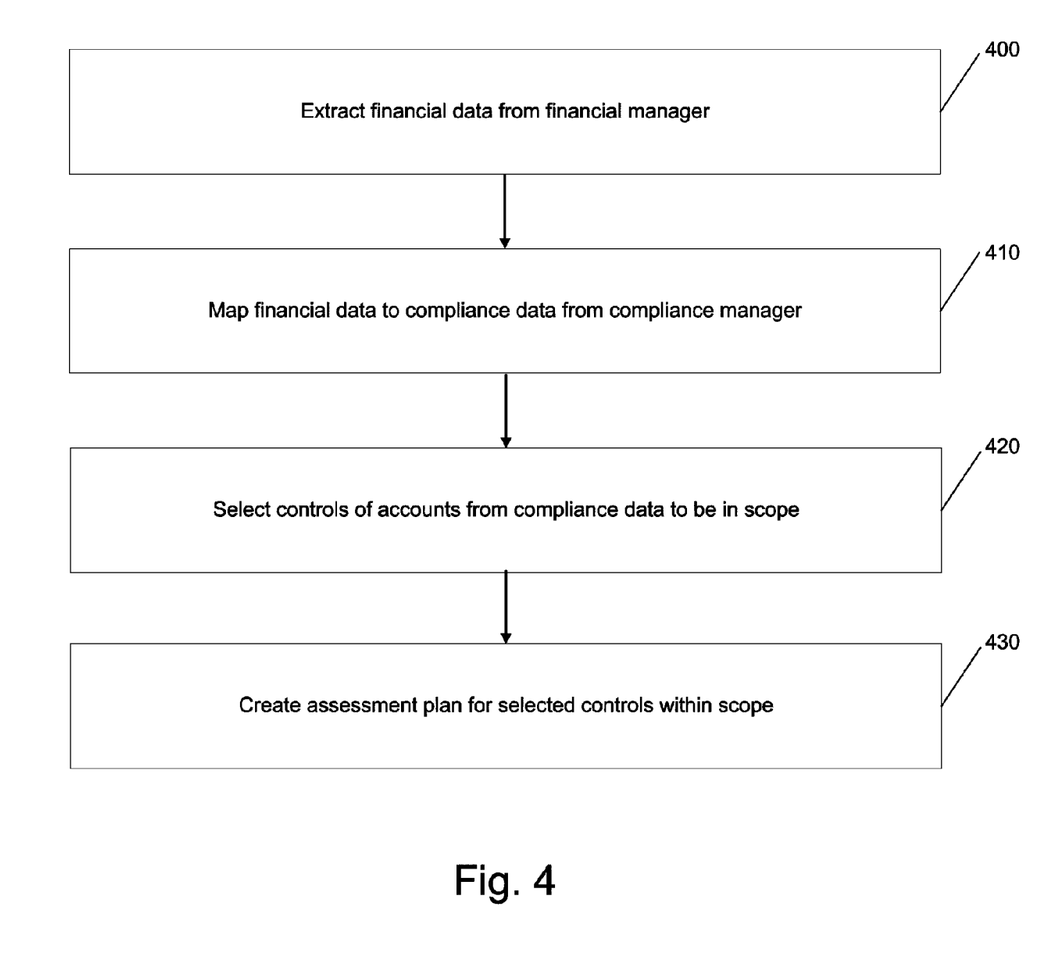
FIG. 4 illustrates a flow diagram in accordance with one embodiment of the invention.

FIG. 4 illustrates a flow diagram in accordance with an embodiment of the invention. In one embodiment, the functionality of the flow diagram of FIG. 4 is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in one embodiment, the functionality of the flow diagram of FIG. 4 is implemented by financial audit scoping module 16 of FIG. 1. In another embodiment, the functionality of the flow diagram of FIG. 4 is implemented by workbench 200 of FIG. 2. In another embodiment, the functionality of the flow diagram of FIG. 4 is implemented by workbench 300 of FIG. 3.

The process illustrated in FIG. 4 begins within a workbench interface. At 400, financial data is extracted from a financial manager. In one embodiment, the workbench interface extracts financial data from the financial manager by first connecting to the financial manager, extracting the financial data from the financial manager, and storing the financial data in one or more staging tables. In this embodiment, the financial data can be stored in a schema of a database, and the one or more staging tables of the workbench interface may include a local database schema. In one embodiment, the local database schema can be a star schema.

At 410, the financial data extracted at 400 is mapped to compliance data from a compliance manager. In one embodiment, the workbench interface allows a user to map dimensions of the financial data to a perspective and user defined attributes of the compliance data. According to the embodiment, the user selects the financial data dimension and then selects the associated compliance data perspective. The user can then assign a perspective type to the mapped dimension/perspective. Finally, the user can also assign a string value for one or more user-defined attributes. The string value can be used to determine the position of the user-defined attribute.

According to the embodiment, after the user has mapped dimensions of the financial data to a perspective and user defined attributes of the compliance data, the workbench interface can select and extract the dimensions and financial values based on the selections and store the extracted data in a star-schema database for further processing. In the embodiment, the new standard star-schema database file includes the perspectives, perspective items, and associated user-defined attributes of the compliance data, and includes the financial values of the associated compliance data.

At 420, one or more controls tied to one or more accounts from the compliance data are selected to be within an audit scope. In an embodiment, the workbench interface displays a list of mapped dimensions from 410 as perspectives. A user can select one or more perspectives according to a selection criteria. For example, in an embodiment, a user may enter a value and select all the perspectives whose names match the entered value. According to different embodiments, "match" may mean that the name of the perspective is the same as the entered value, or may merely mean that the name of the perspective begins or ends with the characters of the entered value.

In an embodiment, the workbench interface can also provide account filters to further specify the selections made on the perspective. Account filters can filter the accounts displayed for a particular perspective. In one embodiment, account filters can filter the accounts based on a financial value of the accounts. In this embodiment, account filters can filter according to various methods based on an amount entered by a user. Examples of these methods include an amount difference method, a threshold method, a difference percentage method, and a total percentage method.

According to the amount difference method, when a filter is applied, the workbench interface only displays accounts for the selected perspective where a difference between an actual financial value and a budget financial value is greater or equal to the entered value. According to the threshold method, when a filter is applied, a workbench interface only displays accounts for the selected perspective where the actual financial value is greater or equal to the entered value. According to the percentage difference method, when a filter is applied, the workbench interface only displays accounts for the selected perspective where a percentage difference between an actual financial value and budget financial value is greater than or equal to the entered value. According to the total percentage method, when a filter is applied, the workbench interface only displays accounts for the selected perspective where an actual financial value is a percentage of total revenue that is greater or equal to the entered value.

In an embodiment, the workbench interface can also provide risk filters to further specify the selections made on the perspective. Risk filters allow a user to create one or more "rules" that target controls that are of significant risk for an audit or other assessment purposes. In one embodiment, a user can select a risk context or a risk class, or a combination of the two. Once the filter is applied, the workbench interface only displays accounts for the selected perspective where the risk levels are equal to the selected risk level, where the risk rating or risk tolerance are equal to the selected risk rating, or a combination of the above. In this embodiment, a user can also select a control stratification. Control stratification refers to an assignment of a control to a particular risk. Because controls can be shared to mitigate multiple risks, the control stratification can vary depending on which risk it is related to.

In an embodiment, the workbench interface can display one or more accounts based on the selection and filtering criteria discussed above. By selecting one or more accounts, the user can cause the workbench interface to display the controls that are mapped to the selected account(s), and that meet any risk and control stratification criteria, in a control table.

In an embodiment, the workbench displays one or more controls of the selected accounts in a control table. The workbench can display control properties to help the user determine whether the control(s) should be considered "in-scope" for a given assessment plan. In the embodiment, individual controls, or groups of controls, can be selected to be in scope or out of scope, and can be selected for certain assessment activities.

Once a user determines that a control should be considered "in-scope," according to an embodiment, the user can add the control to a "cart." A "cart" is a collection of one or more controls that the user can determine to be within a scope of an audit or other assessment. Thus, the cart can be considered a staging area for creating a controls assessment plan. In one embodiment, the workbench interface can provide one or more graphs with key indicators for coverage and control information that can assist the user in finalizing a set of one or more controls to be included in an assessment plan.

At 430, an assessment plan is created for the selected one or more controls within the audit scope. In one embodiment, the assessment plan includes one or more tasks that relate to completing an audit. The assessment plan includes one task for each selected control. For example, if 20 controls are selected to be scoped by an audit, then the assessment plan includes 20 tasks. According to the embodiment, the assessment plan is stored in the star-schema database. Furthermore, according to the embodiment, a user can access the assessment plan via the compliance manager, where a user can mark each task of the assessment plan as either complete or incomplete.

In an embodiment, the process in FIG. 4 can be performed periodically. In this embodiment, only new financial data that was not present in the financial manager when the process previously ran is extracted. In an alternative embodiment, financial data that has been previously scoped by the workbench interface can be imported into the workbench as a starting point for future extraction of financial data.

Figure 5:
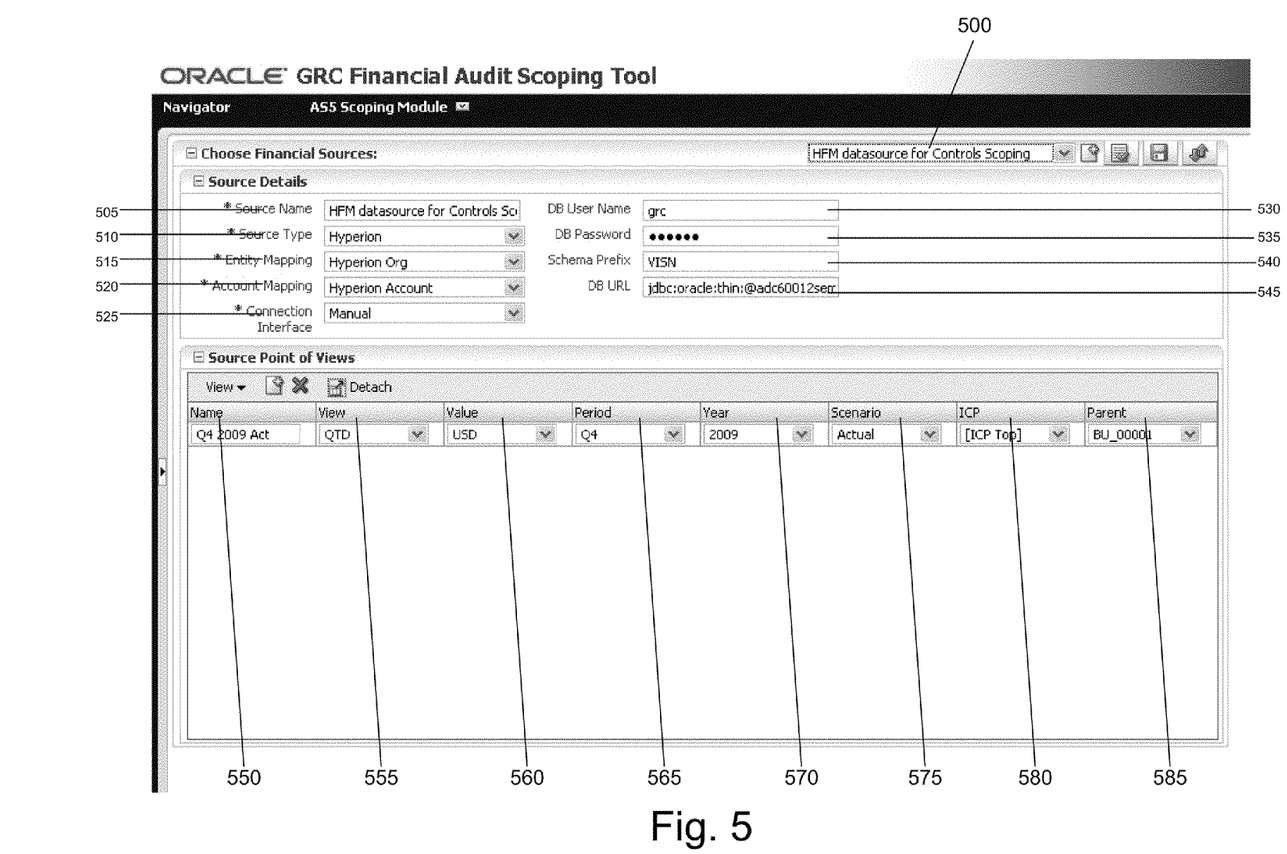
FIG. 5 illustrates a workbench interface in accordance with an embodiment of the invention.

FIG. 5 illustrates a workbench interface in accordance with an embodiment of the invention. One of ordinary skill in the art would readily appreciate that the visual appearance of workbench interface illustrated in FIG. 5, and also illustrated in FIGS. 6-10, is merely an example according to an embodiment, and that the visual appearance of the workbench interface may be modified and still be within the scope of the invention.

According to an embodiment, the workbench interface illustrated in FIG. 5 displays a screen which allows the workbench interface to choose a financial source that the workbench interface can establish a connection with. The workbench interface can utilize this connection to extract financial data from the financial manager. According to the embodiment, the workbench interface provides data source 500, which is a drop-down list of previously selected financial sources. The workbench interface also allows a user to enter a new financial source, or edit the connection details of a previously selected financial source. According to the embodiment, the workbench interface provides the following data fields to establish a connection with a financial manager: source name 505, source type 510, entity mapping 515, account mapping 520, connection interface 525, DB user name 530, DB password 535, schema prefix 540, and DB URL 545. A user can either enter a value or select a value from a drop down list for each field. Source name 505 identifies the name of the financial source, and source type 510 identifies the type of the financial source. Entity mapping 515 identifies the field of the financial manager that is the entity field and Account mapping identifies the field of the financial manager that is the account field. Connection interface 525, DB user name 530, DB password 535, schema prefix 540, and DB URL 545 each identify parameters of the underlying database of the financial source, namely, the type of connection to the database, the user name of the database, the password of the database, the prefix of the database schema, and the URL of the database, respectively.

The workbench interface illustrated in FIG. 5 also displays a point of view area for the financial source. According to the embodiment, in the point of view area displayed by the workbench interface, a user can map financial data with compliance data. In an embodiment of the invention, the user can map dimensions of the financial data to a perspective and user defined attributes of the compliance data.

In the illustrated embodiment, the workbench interface displays the following fields: Name 550, View 555, Value 560, Period 565, Year 570, Scenario 575, Intercompany (ICP) 580, and Parent 585. For Name 550, the workbench interface displays a data field, where a user can enter a name for the dimension mapping in the data field. For View 555, the workbench interface displays a drop-down list of various modes of calendar intelligence (such as Periodic, Year-to-Date, and Quarter-to-Date), where a user can select one of the views and control how the financial values are calculated. For example, if a user selects Periodic, then the financial values for each month can be displayed. However, if the user selects Year-To-Date or Quarter-to-Date, the cumulative financial values for the year or quarter can be displayed. For Value 560, the workbench interface displays a drop-down list of types of financial values, such as input currency, parent currency, adjustment, and consolidation detail, where a user can select one of the types of financial values. For Period 565, the workbench interface displays a drop-down list of time periods, such as quarters and months, where a user can select one of the time periods.

For Year 570, the workbench interface displays a drop-down list of fiscal years or calendar years, where a user can select one of the fiscal years or calendar years. For Scenario 575, the workbench interface displays a drop-down list of various sets of data, such as Budget (i.e., set of data that reflects targeted business operations), Actual (i.e., a set of data from a general ledger that reflects actual business operations), and Forecast (i.e., a set of data that reflects predicted business operations), where a user can select one of the sets of data. For ICP 580, the workbench interface displays a drop-down list of the intercompany balances that exist for a specific account, and the user can select one of the intercompany balances. For Parent 585, the workbench interface displays a drop-down list of parent accounts that exist for a specific account, and the user can select one of the parent accounts.

Figure 6:
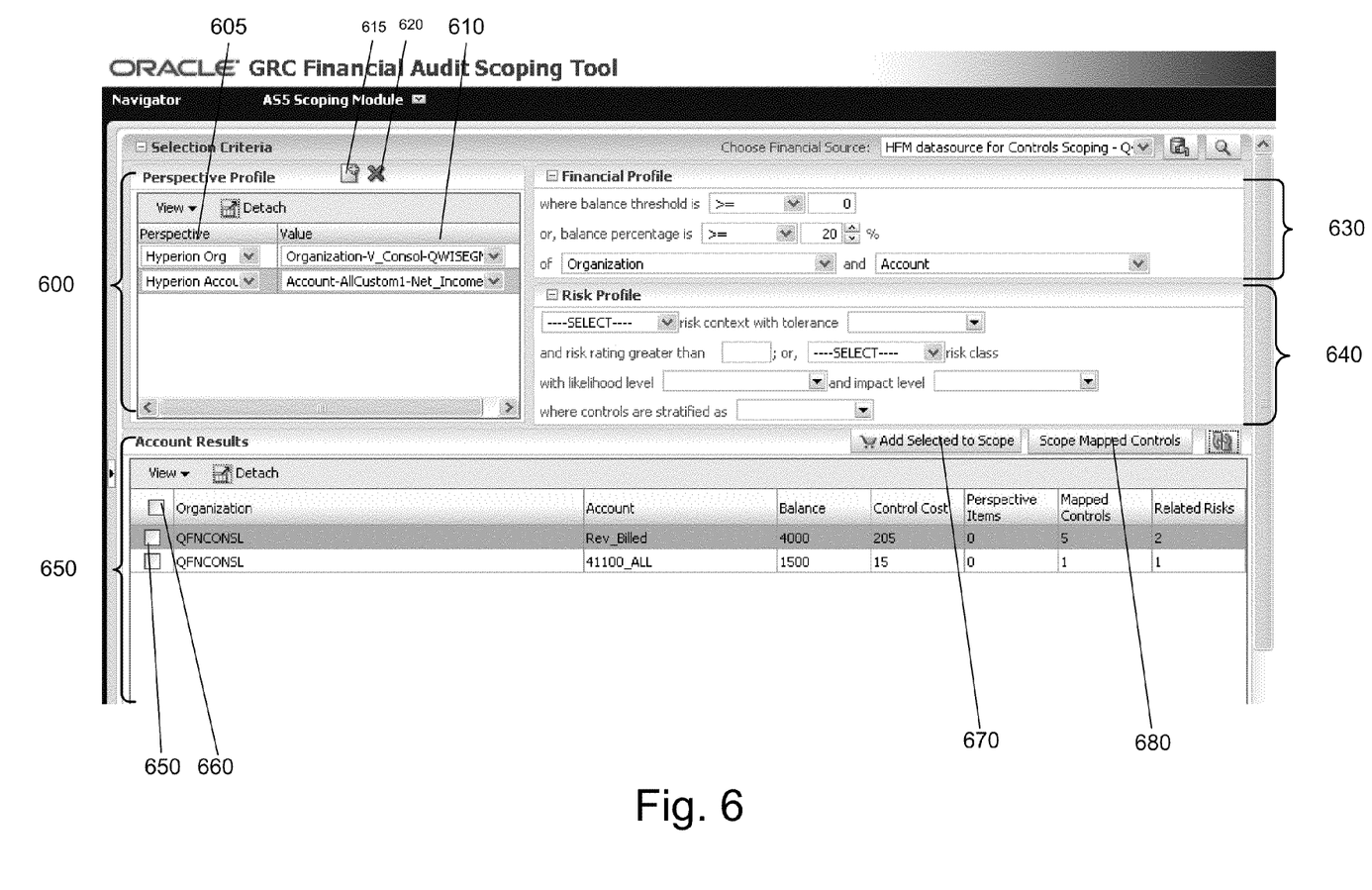
FIG. 6 illustrates a workbench interface in accordance with another embodiment of the invention.
Figure 7:
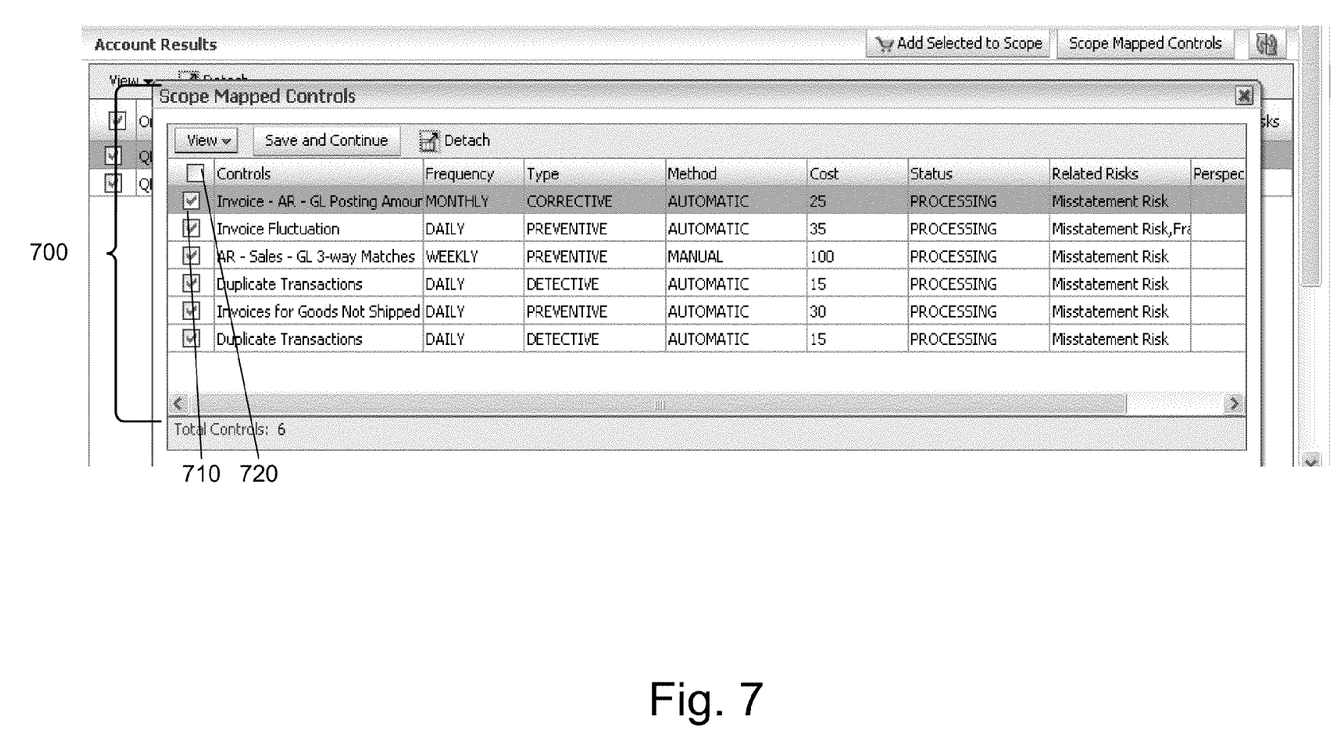
FIG. 7 illustrates a workbench interface in accordance with another embodiment of the invention.
Figure 8A:
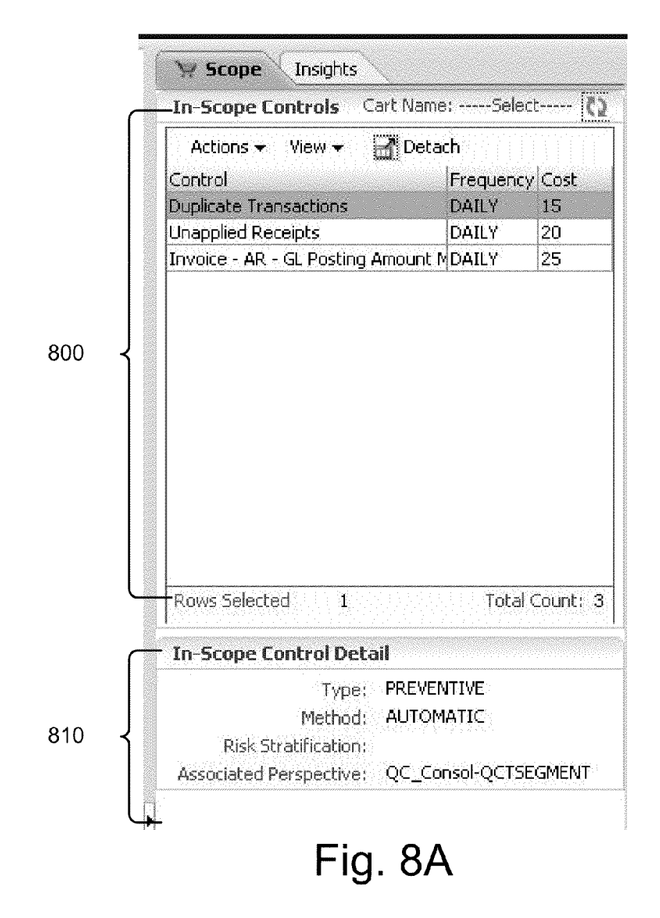
FIG. 8A illustrates a workbench interface in accordance with another embodiment of the invention.
Figure 8B:
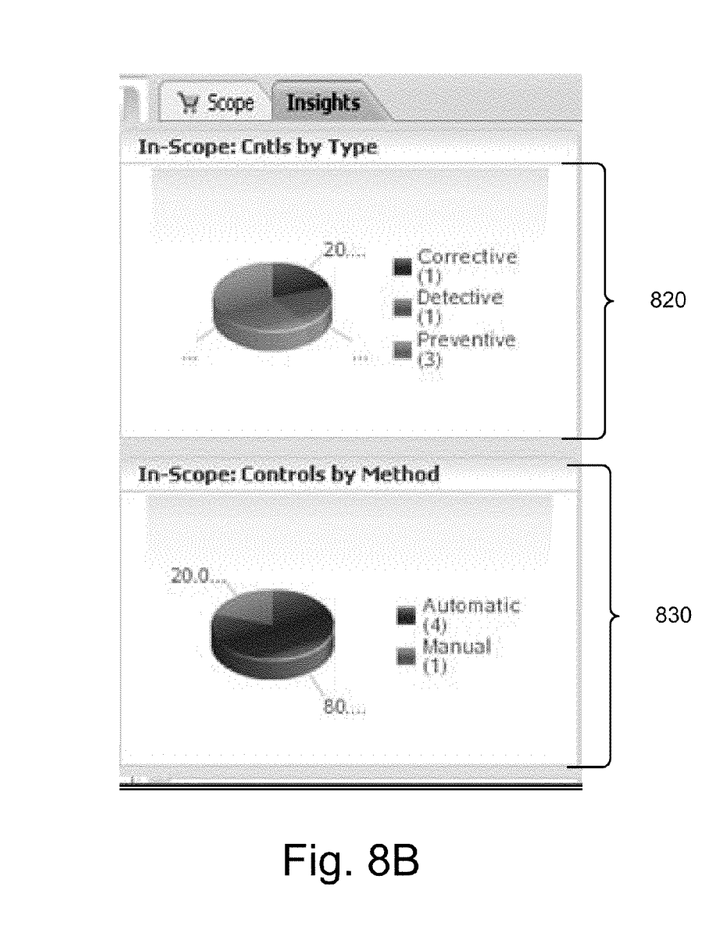
FIG. 8B illustrates a workbench interface in accordance with another embodiment of the invention.

FIG. 6 illustrates a workbench interface in accordance with another embodiment of the invention. In the embodiment, FIG. 6, as well as FIGS. 7, 8A, and 8B, illustrate a scoping workbench displayed by the workbench interface. The scoping workbench can be organized into several sections that facilitate an iterative scoping process by utilizing embedded analysis, key indicators, tables and graphs. While the layout of the scoping workbench displayed by the workbench interface may be displayed in any format, in the embodiment illustrated in FIG. 6, as well as in FIGS. 7, 8A, and 8B, the layout of the scoping workbench is optimized for a task flow of working from top-left to bottom-right.

In the illustrated embodiment, the scoping workbench displayed by the workbench interface includes the following sections: Perspective Profile 600, Financial Profile 630, Risk Profile 640, and Account Results 650. Perspective Profile 600 allows a user to select from one or more compliance data perspectives using selection criteria.

In Perspective Profile 600, the workbench interface displays the following fields: Perspective 605, and Value 610. Perspective 605 displays a drop-down list of compliance data perspectives. The drop-down list of compliance data perspectives are the compliance data perspectives that were previously mapped to financial data dimensions. A user can select a compliance data perspective from the drop-down list of compliance data perspectives. Value 815 is a data field where a user can enter a value to be used as the selection criteria to select one or more perspectives.

In Perspective Profile 600, the workbench interface also displays the following buttons: Add Perspective 615 and Delete Perspective 620. If a user wishes to add another perspective selection criteria, the user can select Add Perspective 615, and new data fields are displayed under Perspective 605, and Value 610. If a user wishes to delete a perspective selection criteria, the user can select Delete Perspective 620, and the highlighted perspective selection criteria will no long be displayed by the workbench interface.

Financial Profile 630 can be used (although it is not required) to further specify the account selections for each selected perspective. Financial Profile 630 provides methods for filtering returned results based on financial values of accounts. Examples of these methods include an amount difference method, a threshold method, a difference percentage method, and a total percentage method. The specifics of each method are discussed above in relation to the embodiment illustrated in FIG. 4.

In Financial Profile 630, through the use of drop-down menus and data fields, a user can further filter the accounts selected for each perspective. For example, through the use of drop-down menus and data fields, a user can filter accounts for a specified perspective based on a specified balance threshold amount. As another example, through the use of drop-down menus and data fields, a user can filter accounts for a specified perspective based on a specified balance percentage.

Risk Profile 640 can be used (although it is not required) to further specify the control selections for each selected account. Once a user has selected their data by perspective (and possibly also by filtering method), a user can further filter the resulting data by risk. Risk filters can allow a user to target one or more controls that are of significant risk for an audit or other similar assessment purposes.

In Risk Profile 640, through the use of drop-down menus and data fields, a user can further filter the accounts selected for each perspective. For example, through the use of drop-down menus and data fields, a user can filter accounts based on a specified risk context and specified risk rating. As another example, through the use of drop-down menus and data fields, a user can filter accounts based on a specified risk class and specified control stratification.

In the illustrated embodiment, after a user has entered all relevant selection criteria in Perspective Profile 600 (and optionally in Financial Profile 630 and Risk Profile 640), the workbench interface can display a list of accounts that meet the selection criteria (where the selection criteria can optionally include account filtering criteria and/or risk filtering criteria) in Account Results 650. In Account Results 650, the workbench interface displays each account that meets the selection criteria and also displays account information for each account. Columns that are displayed can be configured, and the table including the accounts can be detached and expanded as necessary. All columns can be sorted in ascending or descending order.

For example, in the illustrated embodiment, the workbench interface displays the following columns in Account Results 650: Organization, Account, Balance, Control Cost, Perspective Items, Mapped Controls, and Related Risks. In the illustrated embodiment, the workbench interface also displays a list of accounts which are returned based on the selection criteria previously discussed.

The Organization column displays the name of the organization perspective. The Account column include the name of account. The Balance column displays the financial value for the account that was extracted from the financial manager. If account filters are applied, the Balance column only includes accounts whose amounts met the account filtering methods. The Control Cost column displays a control cost field from compliance data. The cost can be expressed in any unit of measure including U.S. dollars, hours, or other units of work. The Perspective Items column displays a number of perspective items. The Mapped Controls displays a number of controls mapped to the account. The control count will vary depending on any applied risk filters. For example, if the risk filter is set to show only "Key" controls, the control count only indicates "Key" controls, instead of all controls. The Related Risks column displays a number of controls where at least one risk is related to each control. For example, if a risk is related to five controls that are mapped to an account, then the control count value will equal "5", and the risk related controls will also equal "5". If a risk filter is applied (for example, a risk rating of "10" is selected) then the risk related controls value will include the number of controls with an associated risk where the risk rating is "10."

To the left of each displayed account, is checkbox 650, and above each checkbox 650 is a global checkbox 660. In order to select one or more controls of an account to be added to a in-scope cart (i.e., to be within scope) a user can select checkbox 650 located next to the account. If a user desires to select the controls all listed accounts to be added to the in-scope cart, the user can select global checkbox 660. Once all the accounts have been selected, either through selecting individual checkboxes 650 or global checkbox 660, the user can select Add Selected to Scope button 670, and all selected accounts will be added to the in-scope cart. Once the user has added all the desired accounts into the in-scope cart, the user can select Scope Mapped Controls to display a Scope Mapped Controls table (discussed in relation to FIG. 7 in more detail) that displays all the controls that are mapped to the selected accounts (including any selected financial and risk criteria).

FIG. 7 illustrates a workbench interface in accordance with another embodiment of the invention. FIG. 7 illustrates a scoping workbench displayed by the workbench interface. In the illustrated embodiment, FIG. 7 shows a portion of the scoping workbench that is displayed in front of the portion of the scoping workbench shown in FIG. 6. However, one of ordinary skill in the art would readily appreciate that the layout of the scoping workbench displayed by the workbench interface may be displayed in any format.

In the illustrated embodiment, the scoping workbench displayed by the workbench interface includes the section Scope Mapped Controls 700. Scope Mapped Controls 700 displays properties of one or more controls. Scope Mapped Controls 700 can help a user analyze and determine whether control(s) should be considered "in-scope" for a given control assessment plan. Individual controls and groups of controls can be selected to either be in scope or out of scope.

For example, in the illustrated embodiment, the workbench interface displays the following columns in Scope Mapped Controls 700: Controls, Frequency, Type, Method, Cost, Status, and Related Risks. The Controls column displays a short name that describes the nature of the control. The Frequency column displays an recommendation of how often the control should be assessed. The Type column displays the type of the control. The Method column displays how the control is implemented. The Cost column displays the cost of the control. The cost can be expressed in any unit of measure including U.S. dollars, hours, or other units of work. The Status column displays whether the control is active or in some other state. The related risks column displays the name of each risk related to the control.

In the illustrated embodiment, Scope Mapped Controls 700 also includes checkbox 710 for each control, and global checkbox 720. Checkbox 710 allow a user to select whether or not each control in Scope Mapped Controls 700 is to be included in the scope of the assessment plan. Global checkbox 720 allows a user to select whether or not all controls in Scope Mapped Controls 700 are to be included in the scope of the assessment plan.

FIG. 8A illustrates a workbench interface in accordance with another embodiment of the invention. FIG. 8A illustrates a scoping workbench displayed by the workbench interface. In the illustrated embodiment, the scoping workbench displayed by the workbench interface includes the following sections: In-Scope Controls 800 and In-Scope Control Detail 810. In-Scope Controls 800 displays a staging area that is used to create an assessment plan, and includes one or more controls that a user has selected to be within the scope of an assessment plan. In-Scope Control Detail 810 displays the details of a control highlighted by the user in section In-Scope Controls 800. Data from section In-Scope Controls 800 can be utilized to further determine which controls should be included in the assessment plan.

For example, in the illustrated embodiment, the workbench interface displays the following columns in In-Scope Controls 800: Control, Frequency, and Cost. The Control column displays a short name that describes the nature of the control. The Frequency column displays an recommendation of how often the control should be assessed. The Cost column displays the cost of the control. The cost can be expressed in any unit of measure including U.S. dollars, hours, or other units of work.

FIG. 8B illustrates a workbench interface in accordance with another embodiment of the invention. The workbench interface displays graphs with key indicators which indicate control information and coverage to assist the user in finalizing a set of one or more controls to be included in the assessment plan. The workbench interfaces renders the charts based on the one or more controls within In-Scope Controls 800 of FIG. 8A. In the illustrated embodiment, the workbench interface includes two chart sections: In-Scope: Controls by Type 820 and In-Scope: Controls by Method. In-Scope: Controls by Type 820 can display a chart which shows the controls within a scope by a type of the control. In-Scope" Controls by Method 830 can display a chart which shows the controls within a scope by a method of the control.

Once a user has customized the one or more desired controls, using In-Scope Controls 800 and In-Scope Control Detail 810 of FIG. 8A, and using In-Scope: Controls by Type 820 and In-Scope Controls by Method 830 of FIG. 8B, a user can create an assessment plan involving the one or more desired controls. The assessment plan will be described in more detail in relation to FIGS. 9 and 10.

Figure 9:
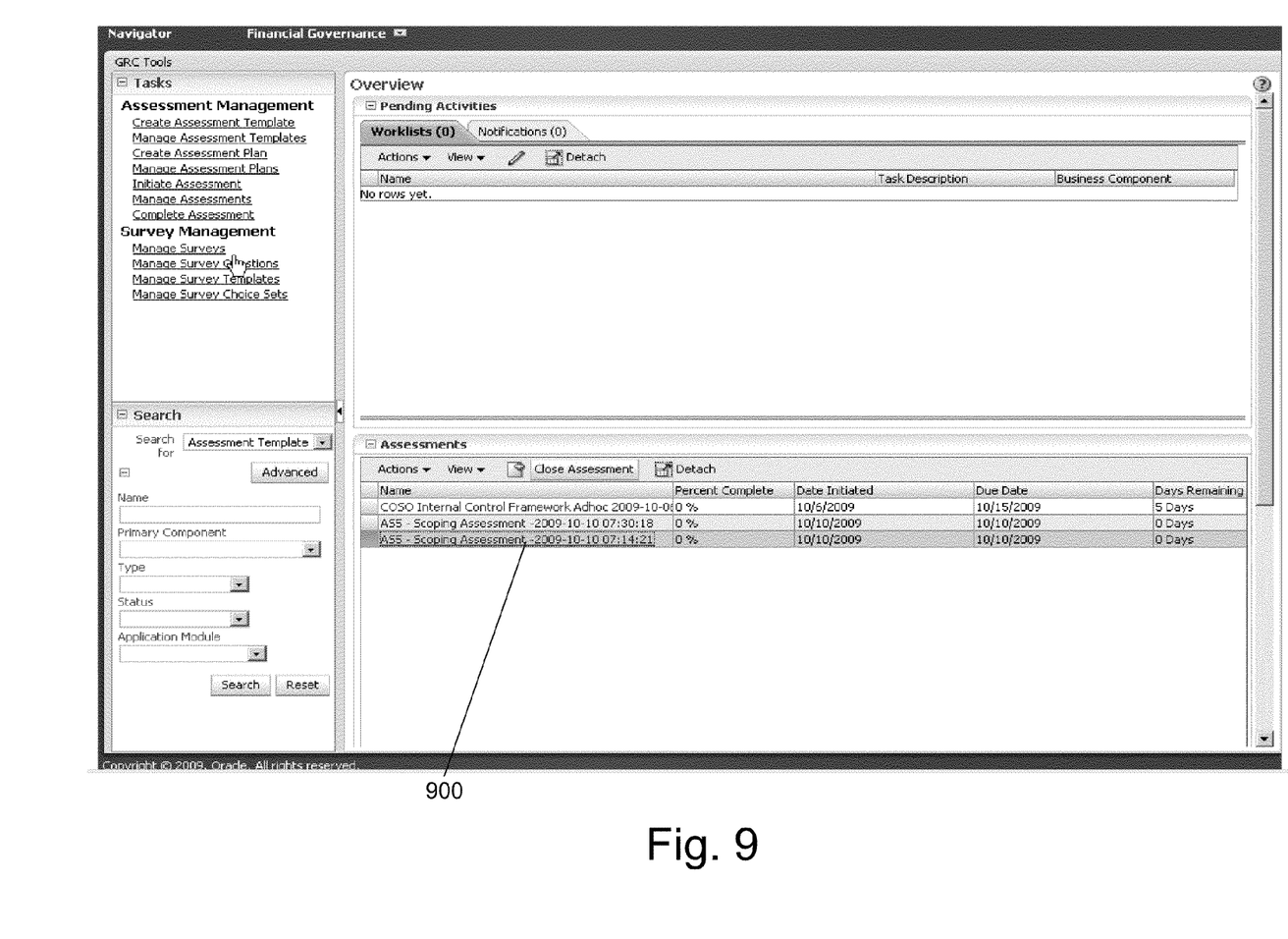
FIG. 9 illustrates a user interface in accordance with an embodiment of the invention.

FIG. 9 illustrates a user interface in accordance with an embodiment of the invention. The user interface is a user interface of a compliance manager, and the user interface displays assessment plan 900, which is automatically generated by a scoping workbench, as previously discussed.

Figure 10:
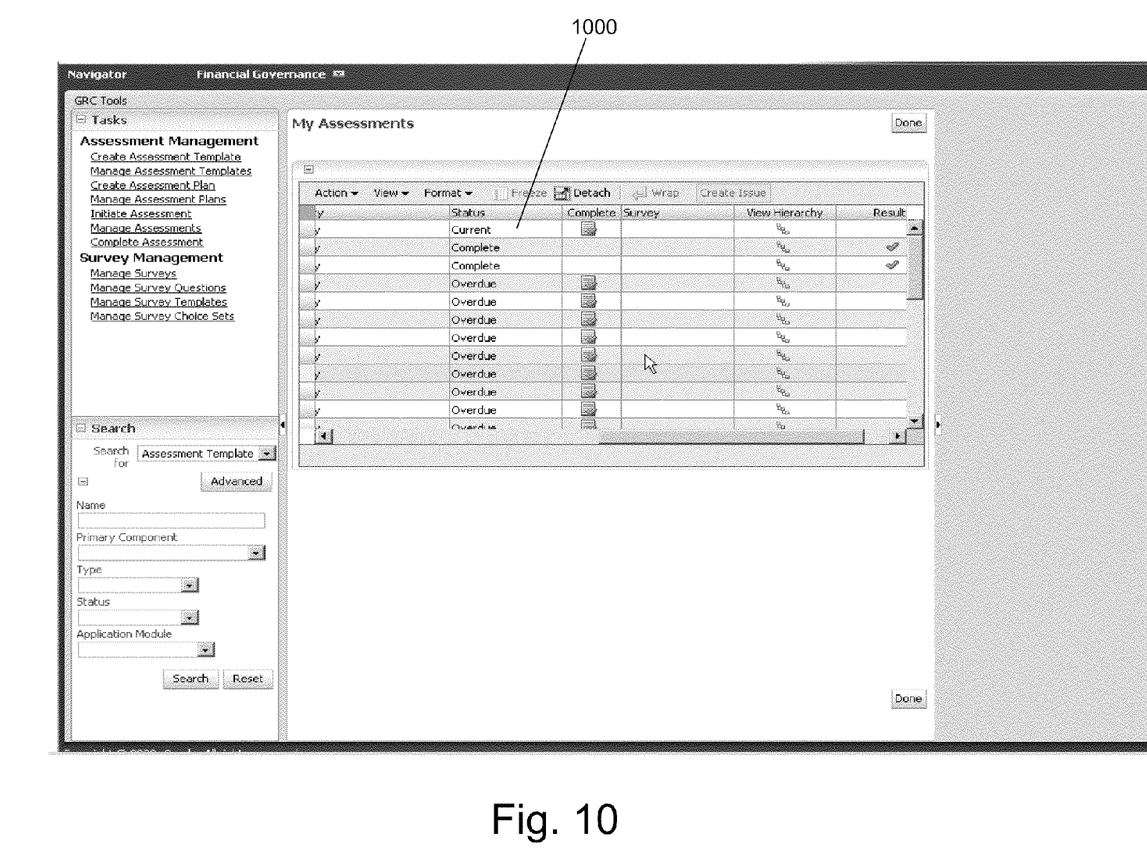
FIG. 10 illustrates a user interface in accordance with another embodiment of the invention.

FIG. 10 illustrates a user interface in accordance with another embodiment of the invention. The user interface is a user interface of a compliance manager and is accessible by a user selecting assessment plan 900 of FIG. 9. After a user selects assessment plan 900, the user interface of the compliance manager displays a list of tasks, as illustrated in FIG. 10. Each control that is to be audited in the assessment plan is indicated as a separate task of the assessment plan. Task 1000 is an example of the tasks listed in the assessment plan, and corresponds to a control that was selected to be in scope of the assessment plan. Each assessment plan task can be marked by the user as being completed, or some other status indicator.

Thus, according to an embodiment of the invention, a scoping workbench can provide a single workspace which bridges financial data and compliance data in order to provide an analytical view for determining, prioritizing, and selecting controls for an assessment plan. According to an embodiment, a scoping workbench can provide immediate feedback in terms of the criteria and cost of an audit and the coverage it provides. The workbench interface can also allow a user to query historical selections. Furthermore, the workbench interface can provide an easy-to-use format and allow for an easier selection of accounts and controls for an audit.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to perform audit scoping, the audit scoping comprising:
   extracting financial data from a financial manager, wherein the financial data comprises one or more accounts;
   mapping the financial data to compliance data from a compliance manager, wherein the compliance data comprises one or more controls, wherein a control comprises an action that acts to minimize a risk, wherein the mapping further comprises mapping one or more dimensions of the financial data to a perspective and one or more user-defined attributes of the compliance data, and wherein the mapped perspective comprises the mapped one or more dimensions and the mapped one or more user-defined attributes;
   selecting one or more mapped perspectives based on a selection criteria, wherein at least one selected mapped perspective comprises at least one account and at least one control mapped to the at least one account;
   displaying the at least one account and the at least one control mapped to the at least one account within a user interface, wherein the display of the at least one account and the at least one control mapped to the at least one account is based on the one or more selected mapped perspectives;
   filtering the display of the at least one account and the at least one control mapped to the at least one account within the user interface based on at least one of: a selection criteria, or a risk criteria;
   selecting one or more controls of one or more accounts from the displayed at least one account and the displayed at least one control mapped to the at least one account to be in an audit scope by adding the one or more controls to a cart, wherein the cart comprises a staging area that is displayed within the user interface;
   displaying one or more charts that indicate the one or more controls that have been added to the cart within the user interface, wherein the one or more controls are grouped by one or more key performance indicators; and
   creating an assessment plan for the selected one or more controls within the audit scope.

2. The non-transitory computer-readable medium of claim 1, the audit scoping further comprising storing the financial data in one or more staging tables.

3. The non-transitory computer-readable medium of claim 2, wherein the one or more staging tables are located in a local database schema.

4. The non-transitory computer-readable medium of claim 3, wherein the local database schema comprises a star-shaped database schema.

5. The non-transitory computer-readable medium of claim 1, wherein the selection criteria comprises selecting one or more perspectives where a name of the perspective matches an entered value.

6. The non-transitory computer-readable medium of claim 1, wherein the selecting one or more controls comprises,
   selecting one or more accounts from a perspective using a selection criteria, and
   selecting the one or more controls from the one or more accounts.

7. The non-transitory computer-readable medium of claim 6, wherein the selection criteria comprises at least one of an amount difference method, a threshold method, a difference percentage method, or a total percentage method.

8. The non-transitory computer-readable medium of claim 1, wherein the selecting one or more controls comprises,
   selecting one or more accounts from a perspective where an associated risk matches a risk criteria, and
   selecting the one or more controls from the one or more accounts.

9. The non-transitory computer-readable medium of claim 8, wherein the risk criteria comprises at least one of selecting one or more accounts where an associated risk level is equal to a selected risk level, selecting one or more accounts where an associated risk rating is equal to a selected risk rating, or selecting one or more accounts where an associated control stratification is equal to a selected control stratification.

10. The non-transitory computer-readable medium of claim 1, the audit scoping further comprising adding one or more controls to a graphical cart.

11. The non-transitory computer-readable medium of claim 10, wherein the graphical cart comprises one or more graphs with key indicators.

12. The non-transitory computer-readable medium of claim 1, wherein the assessment plan comprises a task for each selected control.

13. The non-transitory computer-readable medium of claim 1, wherein the assessment plan is stored in a local star-shaped database schema.

14. The non-transitory computer-readable medium of claim 1, wherein the audit scoping is performed periodically.

15. The non-transitory computer-readable medium of claim 1, the audit scoping further comprising importing financial data that has been previously scoped as a starting point for future extraction of financial data.

16. The non-transitory computer-readable medium of claim 1, further comprising modifying the display of the one or more charts based on modifying the selection of the one or more controls to be in the audit scope.

17. The non-transitory computer-readable medium of claim 1, wherein the one or more controls that have been added to the cart are grouped by a type of a control.

18. The non-transitory computer-readable medium of claim 1, wherein the one or more controls that have been added to the cart are grouped by a method of a control.

19. A computer-implemented method, comprising:
extracting financial data from a financial manager, wherein the financial data comprises one or more accounts;
mapping, by a processor, the financial data to compliance data from a compliance manager, wherein the compliance data comprises one or more controls, wherein a control comprises an action that acts to minimize a risk, wherein the mapping further comprises mapping one or more dimensions of the financial data to a perspective and one or more user-defined attributes of the compliance data, and wherein the mapped perspective comprises the mapped one or more dimensions and the mapped one or more user-defined attributes;
selecting one or more mapped perspectives based on a selection criteria, wherein at least one selected mapped perspective comprises at least one account and at least one control mapped to the at least one account;
displaying the at least one account and the at least one control mapped to the at least one account within a user interface, wherein the display of the at least one account and the at least one control mapped to the at least one account is based on the one or more selected mapped perspectives;
filtering the display of the at least one account and the at least one control mapped to the at least one account within the user interface based on at least one of: a selection criteria, or a risk criteria;
selecting one or more controls of one or more accounts from the displayed at least one account and the displayed at least one control mapped to the at least one account to be in an audit scope by adding the one or more controls to a cart, wherein the cart comprises a staging area that is displayed within the user interface;
displaying one or more charts that indicate the one or more controls that have been added to the cart within the user interface, wherein the one or more controls are grouped by one or more key performance indicators; and
creating an assessment plan for the selected one or more controls within the audit scope.

20. The computer-implemented method of claim 19, the method further comprising storing the financial data in one or more staging tables.

21. The computer-implemented method of claim 19, wherein the selecting one or more controls comprises,
selecting one or more accounts from a perspective using a selection criteria, and
selecting the one or more controls from the one or more accounts.

22. The computer-implemented method of claim 19, wherein the selecting one or more controls comprises,
selecting one or more accounts from a perspective where an associated risk matches a risk criteria, and
selecting the one or more controls from the one or more accounts.

23. The computer-implemented method of claim 19, wherein the computer-implemented method is performed periodically.

24. The computer-implemented method of claim 19, further comprising importing financial data that has been previously scoped as a starting point for future extraction of financial data.

25. An apparatus, comprising:
a processor configured to execute one or more modules;
a memory, operatively coupled to the processor, configured to store the one or more modules;
a financial audit scoping module, when stored on the memory and executed by the processor, configured to cause the apparatus to:
extract financial data from a financial manager, wherein the financial data comprises one or more accounts,
map the financial data to compliance data from a compliance manager, wherein the compliance data comprises one or more controls, wherein a control comprises an action that acts to minimize a risk, wherein the mapping further comprises mapping one or more dimensions of the financial data to a perspective and one or more user-defined attributes of the compliance data, and wherein the mapped perspective comprises the mapped one or more dimensions and the mapped one or more user-defined attributes,
select one or more mapped perspectives based on a selection criteria, wherein at least one selected mapped perspective comprises at least one account and at least one control mapped to the at least one account;
display the at least one account and the at least one control mapped to the at least one account within a user interface, wherein the display of the at least one account and the at least one control mapped to the at least one account is based on the one or more selected mapped perspectives;
filter the display of the at least one account and the at least one control mapped to the at least one account within the user interface based on at least one of: a selection criteria, or a risk criteria;
select one or more controls of one or more accounts from the displayed at least one account and the displayed at least one control mapped to the at least one account to be in an audit scope by adding the one or more controls to a cart, wherein the cart comprises a staging area that is displayed within the user interface;
display one or more charts that indicate the one or more controls that have been added to the cart within the user interface, wherein the one or more controls are grouped by one or more key performance indicators; and
create an assessment plan for the selected one or more controls within the audit scope.

26. The apparatus of claim 25, wherein the financial audit scoping module, when stored on the memory and executed by the processor, is further configured to;
select one or more accounts from a perspective using a selection criteria, and
select the one or more controls from the one or more accounts.

27. The apparatus of claim 25, wherein the financial audit scoping module, when stored on the memory and executed by the processor, is further configured;
select one or more accounts from a perspective where an associated risk matches a risk criteria, and
select the one or more controls from the one or more accounts.

28. The apparatus of claim 25, wherein the apparatus is a stand-alone application that is separate from the compliance manager.

29. The apparatus of claim 25, wherein the apparatus is part of the compliance manager.

* * * * *